United States Patent
Chung et al.

(10) Patent No.: US 7,698,095 B2
(45) Date of Patent: Apr. 13, 2010

(54) APPARATUS, SYSTEM, AND METHOD FOR DETECTING FAN ROTATION DIRECTION IN ELECTRONIC DEVICES

(75) Inventors: Chu Te Chung, Cary, NC (US); C. Charles Dishman, Raleigh, NC (US); Jen-Ching Lin, Apex, NC (US); Randhir S. Malik, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 67 days.

(21) Appl. No.: 12/022,351

(22) Filed: Jan. 30, 2008

(65) Prior Publication Data

US 2009/0190625 A1    Jul. 30, 2009

(51) Int. Cl.
*G01C 9/00* (2006.01)
(52) U.S. Cl. ...................................................... 702/151
(58) Field of Classification Search .................. 702/151
See application file for complete search history.

(56) References Cited

U.S. PATENT DOCUMENTS

| | | | | |
|---|---|---|---|---|
| 5,726,874 | A | 3/1998 | Liang | 363/141 |
| 5,727,928 | A | 3/1998 | Brown | 417/44.11 |
| 5,930,736 | A | 7/1999 | Miller et al. | 702/127 |
| 6,005,762 | A | 12/1999 | Hiroi | 361/103 |
| 6,157,897 | A * | 12/2000 | Yoshikawa | 702/132 |
| 6,646,877 | B2 | 11/2003 | Willers et al. | 361/695 |
| 6,661,655 | B2 | 12/2003 | Yin | 361/687 |
| 6,925,828 | B1 | 8/2005 | Gerstner et al. | 62/259.2 |
| 7,036,027 | B2 | 4/2006 | Kim et al. | 713/300 |
| 2004/0158627 | A1 | 8/2004 | Thornton | 709/224 |
| 2007/0097636 | A1 | 5/2007 | Johnson et al. | 361/695 |
| 2007/0211430 | A1 | 9/2007 | Bechtolsheim | 361/695 |
| 2009/0089604 | A1 * | 4/2009 | Malik et al. | 713/340 |

OTHER PUBLICATIONS

Geany et al., "Operational Indicator System for the IBM Personal Computer Fan", TDB 12-84 p. 4086-4087.
Kiser, "Air Flow Sensor", TDB 11-84 p. 306.

* cited by examiner

*Primary Examiner*—Aditya Bhat
(74) *Attorney, Agent, or Firm*—Kunzler & McKenzie

(57) ABSTRACT

An apparatus, system, and method are disclosed for determining fan rotation direction. A first temperature detection module detects a first temperature at a first location between a fan and a heat generating device. The fan provides cooling for the heat generating device by drawing air from the heat generating device across the first location to the fan when the fan is rotating in a first direction. A second temperature detection module detects a second temperature at a second location where the heat generating device is between the second location and the fan such that heat from the heat generating device is drawn away from the second location when the fan is rotating in the first direction. A temperature comparison module determines if the second temperature is above the first temperature. A fan rotation error module generates a fan rotation error signal if the second temperature is above the first temperature.

20 Claims, 6 Drawing Sheets

APPARATUS, SYSTEM, AND METHOD FOR DETECTING FAN ROTATION DIRECTION IN ELECTRONIC DEVICES

BACKGROUND OF THE INVENTION

1. Field of the Invention

This invention relates to cooling fans and more particularly relates to detecting fan rotation direction in electronic devices.

2. Description of the Related Art

Electronic devices generate heat when in operation. Integrated circuits, resistors, and other components in electronic devices generate heat while operating. Some integrated circuits generate much more heat than other components. For example, switching elements in a switching power supply that constantly switch on and off at a fixed switching frequency typically generate a lot of heat compared to other components in the power supply. Central processing units ("CPUs") also generate a lot of heat. Other integrated circuits may also generate more heat than surrounding components. Even where an electronic device does not have one or more specific components that generate excessive heat, general heat generation within an electronic device may be excessive.

Integrated circuits and other components that generate heat run the risk of being damaged if the temperature of the integrated circuits and components increases above designed limits. Excess heat often causes failures of electronic devices and may decrease the useful life of the electronic devices.

One solution to reduce heat buildup in electronic devices is to use one or more cooling fans. Cooling fans draw air across heat generating devices and act to carry heat away from the heat generating devices. Typically air exterior to an electronic device is at a lower temperature than air surrounding a heat generating device in an electronic device. The exterior air is drawn by a cooling fan into the electronic device and the heated air around the heat generating component is expelled from the electronic device.

Typically a cooling fan is used to pull air through the electronic device and push heated air to the exterior of the electronic device. This creates a slight vacuum compared to air pressure exterior to the electronic device and is typically more efficient than a fan that pushes exterior air into an electronic device, which may increase air pressure within the electronic device with respect to air exterior to the electronic device. Some electronic devices include more than one cooling fan. Some electronic device may include two or more fans that draw air from the electronic device and push the air to the exterior. In other electronic devices, one or more fans positioned at an air intake push air into the electronic device while one or more other fans positioned at an air exhaust pull the air from the electronic device and push the heated air to the outside.

A major problem facing electronic device manufacturers is that fans can be connected incorrectly so that a fan incorrectly connected can push air into the electronic device instead of pulling air from the electronic device as designed. This can cause an increased pressure instead of a vacuum so that cooling provided by the fan is less efficient than designed. In this case, the electronic device may overheat. Often failed electronic devices are returned to an electronic equipment manufacturer where the cause of the failures is a fan connected incorrectly. The failed equipment may be returned with "no defect found" or "NDF" because system diagnostic circuits and software in the electronic device cannot detect a fan spinning the wrong way. A fan spinning the wrong way draws power at a level close to the same fan connected so the fan spins in a correct direction; so a reversed connection typically cannot be detected by sensing fan power.

In addition, electronic devices with a fan connected incorrectly may take a long time to fail so that many electronic devices with incorrectly connected fans may be shipped before the problem is detected. Physically determining if a fan is incorrectly detected at a factory of an equipment manufacturer may also be expensive due to the time taken by employees to check the fan rotation.

Other fan direction detection methods may use some type of air pressure detectors, air flow direction sensors, and the like. Each of these methods requires specialized equipment that may increase cost of production of the electronic devices significantly.

SUMMARY OF THE INVENTION

From the foregoing discussion, it should be apparent that a need exists for an apparatus, system, and method that determine fan rotation direction within an electronic device. Beneficially, such an apparatus, system, and method would detect fan rotation in a cost effective way.

The present invention has been developed in response to the present state of the art, and in particular, in response to the problems and needs in the art that have not yet been fully solved by currently available fan rotation detection techniques. Accordingly, the present invention has been developed to provide an apparatus, system, and method for detecting fan rotation direction in electronic devices that overcome many or all of the above-discussed shortcomings in the art.

The apparatus to detect fan rotation direction is provided with a plurality of modules configured to functionally execute the necessary steps of detecting a first and a second temperature and comparing the temperatures to determine fan rotation direction. These modules in the described embodiments include a first temperature detection module that detects a first temperature at a first location. The first location includes a location between at least one fan and at least one heat generating device where the at least one fan provides cooling for the at least one heat generating device by drawing air from the at least one heat generating device across the first location to the fan when the at least one fan is rotating in a first direction.

The apparatus includes a second temperature detection module that detects a second temperature at a second location. The second location includes a location where the at least one heat generating device is between the second location and the at least one fan such that heat from the at least one heat generating device is drawn away from the second location when the at least one fan is rotating in the first direction. The apparatus includes a temperature comparison module that determines if the second temperature is above the first temperature and a fan rotation error module that generates a fan rotation error signal in response to the temperature comparison module determining that the second temperature is above the first temperature.

The apparatus, in one embodiment, includes a warning module that generates a warning in response to the fan rotation error signal. The warning may be one or more of generating a visible indicator of fan rotation error, transmitting a warning message to system in communication with the fan rotation error module, sending an interrupt, and storing a warning message. In another embodiment, the first temperature detection module and the second temperature detection module each include a temperature sensor. In one embodiment, each temperature sensor is a thermistor, a thermocouple, a resistance thermometer, or a silicon bandgap temperature sensor. In another embodiment, the apparatus includes at least one fan positioned to cool the at least one heat generating device by directing air across second location toward the at least one heat generating device.

In one embodiment, the second location is near the at least one heat generating device such that the temperature comparison module determines that the second temperature is above the first temperature when insufficient air is drawn across the at least one heat generating device. In another embodiment, insufficient air is drawn across the at least one heat generating device due to none of fans are rotating or where two or more fans are included and at least one fan rotates in second direction, the second direction being opposite of the first direction. In another embodiment, the apparatus includes a component sensor module. The second location is near the at least one heat generating device and the second temperature detection module transmits the second temperature to the component sensor module for determining a temperature of the at least one heat generating device near the second location.

In one embodiment, the temperature comparison module includes a comparator. In another embodiment, the first temperature detection module includes two or more temperature sensors and the first temperature detection module combines temperature sensor readings of the two or more temperature sensors to detect the first temperature. In another embodiment, the second temperature detection module includes two or more temperature sensors and the second temperature detection module combines temperature sensor readings of the two or more temperature sensors to detect the second temperature. In yet another embodiment, the apparatus includes a fan power module that determines if the fan is commanded in an on state. The fan rotation error module generates a fan rotation error signal in response to the temperature comparison module determining that the second temperature is above the first temperature and the fan power module determining that the fan is commanded in an on state.

Another apparatus to detect fan rotation direction is included with a first temperature sensor that detects a first temperature at a first location. The first location includes a location between a fan and at least one heat generating device where the fan provides cooling for the at least one heat generating device by drawing air from the at least one heat generating device across the first location to the fan when the fan is rotating in a first direction. The apparatus includes a second temperature sensor that detects a second temperature at a second location. The second location includes a location where the at least one heat generating device is between the second location and the fan such that heat from the at least one heat generating device is drawn away from the second location when the fan is rotating in the first direction.

The apparatus includes a temperature comparator connected to the first temperature sensor and to the second temperature sensor. The temperature comparator compares a first temperature detected by the first temperature sensor with a second temperature detected by the second temperature sensor where the temperature comparator generates and output signal when the second temperature is greater than the first temperature.

A system of the present invention is also presented to detect fan rotation direction. The system may be embodied by an electronic device with a heat generating component and at least one fan positioned to provide cooling for the at least one heat generating component. In particular, the system, in one embodiment, includes a first temperature detection module that detects a first temperature at a first location in the electronic device. The first location includes a location between the at least one fan and the at least one heat generating device, where the at least one fan provides cooling for the at least one heat generating device by drawing air from the at least one heat generating device across the first location to the fan when the at least one fan is rotating in a first direction.

The system includes a second temperature detection module that detects a second temperature at a second location in the electronic device. The second location includes a location wherein the at least one heat generating device is between the second location and the at least one fan such that heat from the at least one heat generating device is drawn away from the second location when the at least one fan is rotating in the first direction. The system includes a temperature comparison module that determines if the second temperature is above the first temperature and a fan rotation error module that generates a fan rotation error signal in response to the temperature comparison module determining that the second temperature is above the first temperature.

In one embodiment the electronic component is a power supply, a computer, a central processing unit ("CPU") apparatus, a switch, a router, a blade, or an appliance. The system may further include a communication connection, where the fan rotation error module transmits the fan rotation error signal to an external device via the communication connection.

A method of the present invention is also presented for detecting fan rotation direction. The method in the disclosed embodiments substantially includes the steps necessary to carry out the functions presented above with respect to the operation of the described apparatus and system. In one embodiment, the method includes detecting a first temperature at a first location. The first location includes a location between at least one fan and at least one heat generating device, where the at least one fan provides cooling for the at least one heat generating device by drawing air from the at least one heat generating device across the first location to the fan when the at least one fan is rotating in a first direction.

The method includes detecting a second temperature at a second location. The second location includes a location where the at least one heat generating device is between the second location and the at least one fan such that heat from the at least one heat generating device is drawn away from the second location when the at least one fan is rotating in the first direction. The method includes determining if the second temperature is above the first temperature and generating a fan rotation error signal in response to determining that the second temperature is above the first temperature.

In a further embodiment, the method includes generating a warning in response to the fan rotation error signal. The warning includes one or more of generating a visible indicator, transmitting a warning message to an external system, sending an interrupt, and storing a warning message. In another embodiment, the fan rotation error signal is generated in response to determining that the second temperature is above the first temperature and determining that the fan is commanded in an on state. In yet another embodiment, the method includes one or more of combining temperature sensor readings of two or more sensors to determine the first temperature and combining temperature sensor readings of two or more sensors to determine the second temperature.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1A:
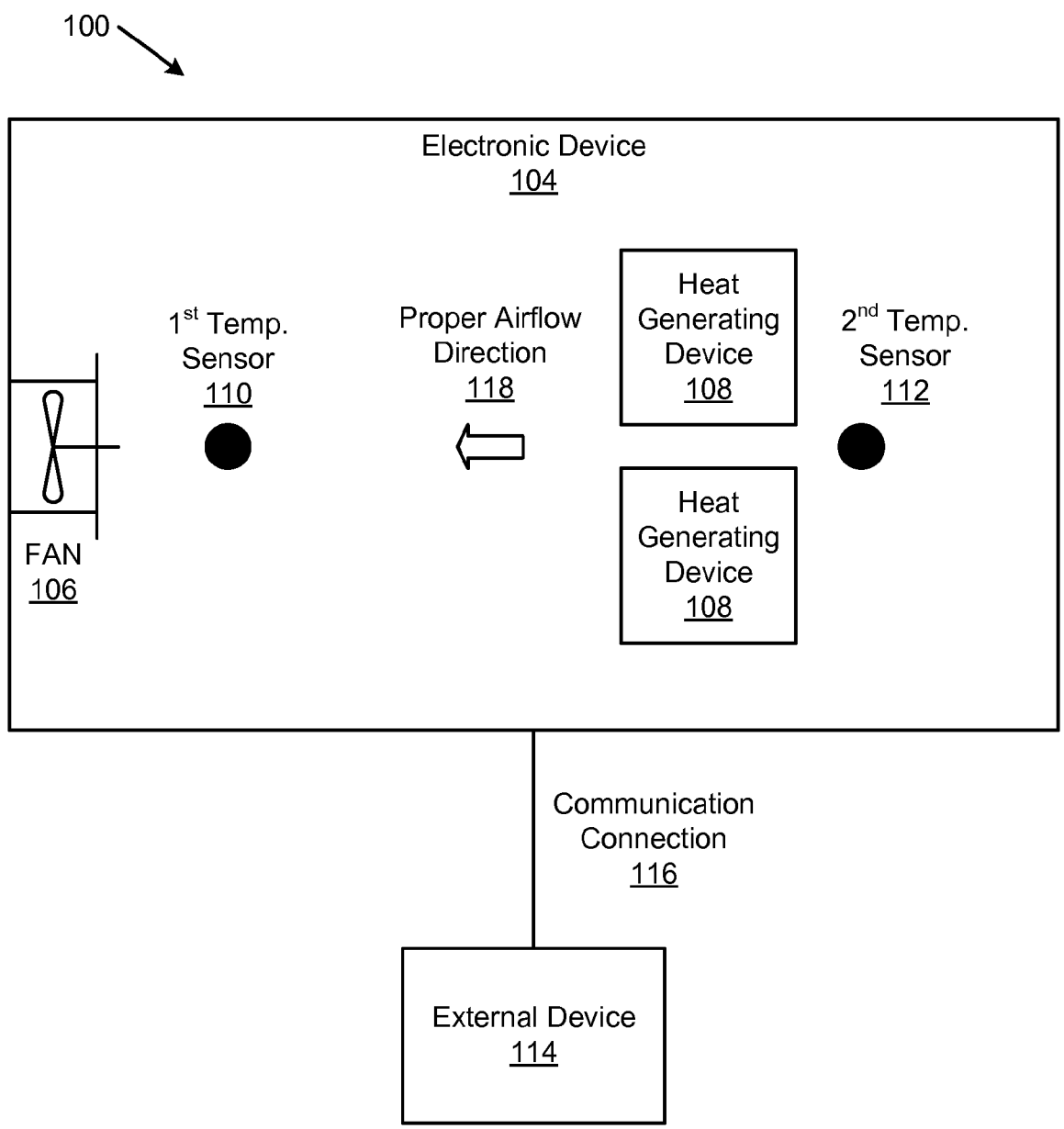
FIG. 1A is a schematic block diagram illustrating one embodiment of a system for detecting fan rotation direction in an electronic device in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable media.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer readable medium may take any form capable of storing machine-readable instructions on a digital processing apparatus. A computer readable medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

FIG. 1A is a schematic block diagram illustrating one embodiment of a system 100 for detecting fan rotation direction in an electronic device in accordance with the present invention. The system 100 includes an electronic device 104 with a fan 106, one or more heat generating devices 108, a first temperature sensor 110, and a second temperature sensor 112, which are described below. The electronic device 104 is connected to an external device 114 through a communication connection 116, which are described below.

The system 100 includes an electronic device 104 with a cooling fan 106. The electronic device 104 may be a power supply, such as a switching power supply, a computer such as a personal computer, laptop computer, a blade server, mainframe computer, etc., a central processing unit ("CPU"), a router, a switch, an appliance, or any other device with electronic components and a cooling fan 106.

In one embodiment, the electronic device 104 is within another electronic device 104 or other equipment. For example, the electronic device 104 may be a power supply within a computer. The cooling fan 106 may push air to the exterior of the computer or into the computer enclosure. In another example, the electronic device 104 is included within another piece of equipment, such as an appliance, vehicle, gaming device, testing equipment, etc. The electronic device 104 may include air ducts or other means to direct the heated air outside the computer or other equipment enclosure. One of skill in the art will recognize other electronic devices 104 cooled with a cooling fan 106 and other examples of equipment with an electronic device 104 that includes a cooling fan 106.

The electronic device 104 includes a cooling fan 106 that cools at least one heat generating device 108. Typically the fan 106 is positioned to pull air through the electronic device 104 and push heated air to the exterior of the enclosure of the electronic device 104 when the fan 106 is properly connected. Many cooling fans 106 include a single phase motor that is configured so that connection of a power source in one polarity rotates the fan 106 in one direction and connection to the power source in the opposite polarity rotates the fan in the opposite direction. In another embodiment, typically in larger equipment, the fan 106 is a three-phase fan 106 with three power connections and reversing any two connections results in the fan 106 spinning in the opposite direction.

Typically, a fan 106 is selected and positioned within the electronic device 104 to draw air in a proper air flow direction 118. The fan 106 is selected based on design parameters assuming that the fan 106 will rotate in a first direction to draw air in the proper airflow direction 118. If the fan 106 is connected improperly so that fan blades of the fan 106 rotate opposite the first direction, often cooling requirements used in selecting the fan 106 are not met and heat in the electronic device 104 is not removed quickly enough and the heat generating device(s) 108 and other components can overheat.

One mechanism that may cause temperature to rise within the electronic device 104 due to improper fan 106 rotation is increased air pressure. When a fan is designed to pull air through an enclosure or compartment of the electronic device 104, a vacuum effect causes the air pressure within the electronic device 104 to decrease below air pressure outside the electronic device 104. When the fan 106 rotates in the opposite direction, air is pushed into the electronic device 104 so that the air is pressurized with respect to air pressure exterior to the electronic device 104. This pressure increase due to the fan 106 rotating in the opposite direction to that in which it was designed often is enough to cause heating problems, component failure, or degradation of useful life of the electronic device 104.

Other factors may also cause problems when the fan 106 rotates in the wrong direction. For example, an air flow path may include baffles, louvers, or other components that restrict air flow in a direction other than the proper air flow direction 118. For example, if louvers are placed on an air intake to the electronic device 104, the louvers may be designed to open only with air flow in the proper direction 118. Air flow in the opposite direction may not open the louvers and may actually force the louvers closed. In this case, the fan 106 will cause a relatively large increase in air pressure in the electronic device 104 and heat from the heat generating device(s) 108 will not be dissipated. Again this can cause component failure or degradation of useful life of the electronic device 104.

The system 100 includes a first temperature sensor 110 at a first location. The first location is between the fan 106 and the one or more heat generating devices 108 such that heat from the heat generating devices 108 moves past the first temperature sensor 110 at the first location toward the fan 106 when the fan 106 is rotating correctly and pulling air in the proper airflow direction 118.

The system 100 includes a second temperature sensor 112 at a second location positioned so the heat generating devices 108 are between the fan 106 and the second temperature sensor 112. The second temperature sensor 112 is positioned such that when the fan 106 is rotating properly, heat from the heat generating devices 108 will be carried away from the second temperature sensor 112. With the temperature sensors 110, 112 positioned as indicated above, when the fan 106 is rotating properly, heat from the heat generating devices 108 will cause a temperature measured at the first temperature sensor 110 ("TS1") to be greater than a temperature measured at the second temperature sensor 112 ("TS2"). However, when the fan 106 is spinning in the opposite direction so air flows in a direction opposite to the proper airflow direction 118, TS2 will be higher than TS1, thus indicating that the fan 106 is spinning in the wrong direction.

In one embodiment, the second temperature sensor 112 is near one or more heat generating devices 108 such that when air is not flowing across the heat generating device 108 and the temperature sensors 110, 112, proximity to the heat generating device(s) 108 causes a temperature measured at the second temperature sensor 112 to be higher than a temperature measured at the first temperature sensor 110. Thus, if the fan 106 is spinning the wrong way or if the fan 106 is stopped, TS2 will be higher than TS1 indicating a problem of either stopped fan 106 or the fan 106 spinning the wrong way.

The system 100 is advantageous because many power supplies, computers, CPUs, etc. include temperature sensors 110, 112 to determine component temperature, ambient temperature, etc. The temperature sensors 110, 112 may be used to give warnings, shut down components, control fan 106 speed, etc. By simply using one or more existing sensors 110, 112 and determining if TS2 is greater than TS1, rotation direction of the fan 106 can be determined very inexpensively compared to other more complex and more costly methods of determining rotation direction of the fan 106.

The temperature sensors 110, 112, are often thermistors. A thermistor is a temperature sensitive resistor that varies in resistance as a function of temperature. Other temperature sensors 110, 112, such as thermocouples, resistance thermometers, silicon bandgap temperature sensors, and the like may also be used. Any temperature sensor 110, 112 may be used that is able to detect a temperature at the first location and second location where the detected temperatures can be compared.

In another embodiment, more than one first temperature sensor 110 is located in the electronic device 104 at the first location. In this embodiment, the first location includes one or more first locations such that each of the first temperature sensors 110 is positioned between one or more heat generating devices 108 and the fan 106 so that air flow when the fan 106 is rotating properly is pulled from the heat generating devices 108 across the first temperature sensors 110 to the fan 106. In a further embodiment, one or more of the first temperature sensors 110 are each positioned down stream from a heat producing device 108.

For example, one first temperature sensor 110 may be positioned downstream between one or more switches, such as metal-oxide-semiconductor field-effect transistors ("MOSFETs"), another first temperature sensor 110 may be positioned between a hard disk drive ("HDD") and the fan 106, and another first temperature sensor 110 may be positioned between a CPU and the fan 106. Temperatures detected by the first temperature sensors 110 may then be combined in some way to form a single first temperature to be compared to a second temperature. For example, the temperatures may be averaged. In another example, the highest measured temperature of the group of first temperature sensors 110 may be the first temperature.

Similarly, more than one second temperature sensor 112 may be used and located in one or more second locations. The second temperature sensors 112 may be paired with heat generating devices 108 or paired with first temperature sensors 110. Temperatures from the second temperature sensors 112 may be combined in a similar way to the first temperature sensors 110. In one embodiment, a temperature from a particular second temperature sensor 112 may be paired with a corresponding first temperature sensor 110 so that a temperature from the second temperature sensor 112 of the pair is higher than the first temperature sensor 110 of the pair indicates incorrect fan rotation direction.

The system 100 includes, in one embodiment, an external device 114 connected to the electronic device 104 through a communication connection 116. A fan rotation error signal, in one embodiment, is transferred over the communication connection 116 to the external device 114. The external device 114 may be a device, electronic equipment, a system, or the like capable of receiving the fan rotation error signal. The external device 114, in one embodiment, is a device encompassing the electronic device 104. For example, if the electronic device 104 is a power supply and the external device 114 is a computer containing and powered by the computer, the power supply may transmit the fan rotation error signal to the computer. The computer may then further transmit the fan rotation error signal to a display, over a network, or other means to notify a user of the fan rotation direction error.

The communication connection 116 may be a bus, a network connection, a telephone connection, a cable, or any other means capable of transmitting the fan rotation error signal to the external device 114. One of skill in the art will recognize other external devices 114 capable of receiving a fan rotation error signal and other communication connections 116 capable of transmitting the fan rotation error signal.

Figure 1B:
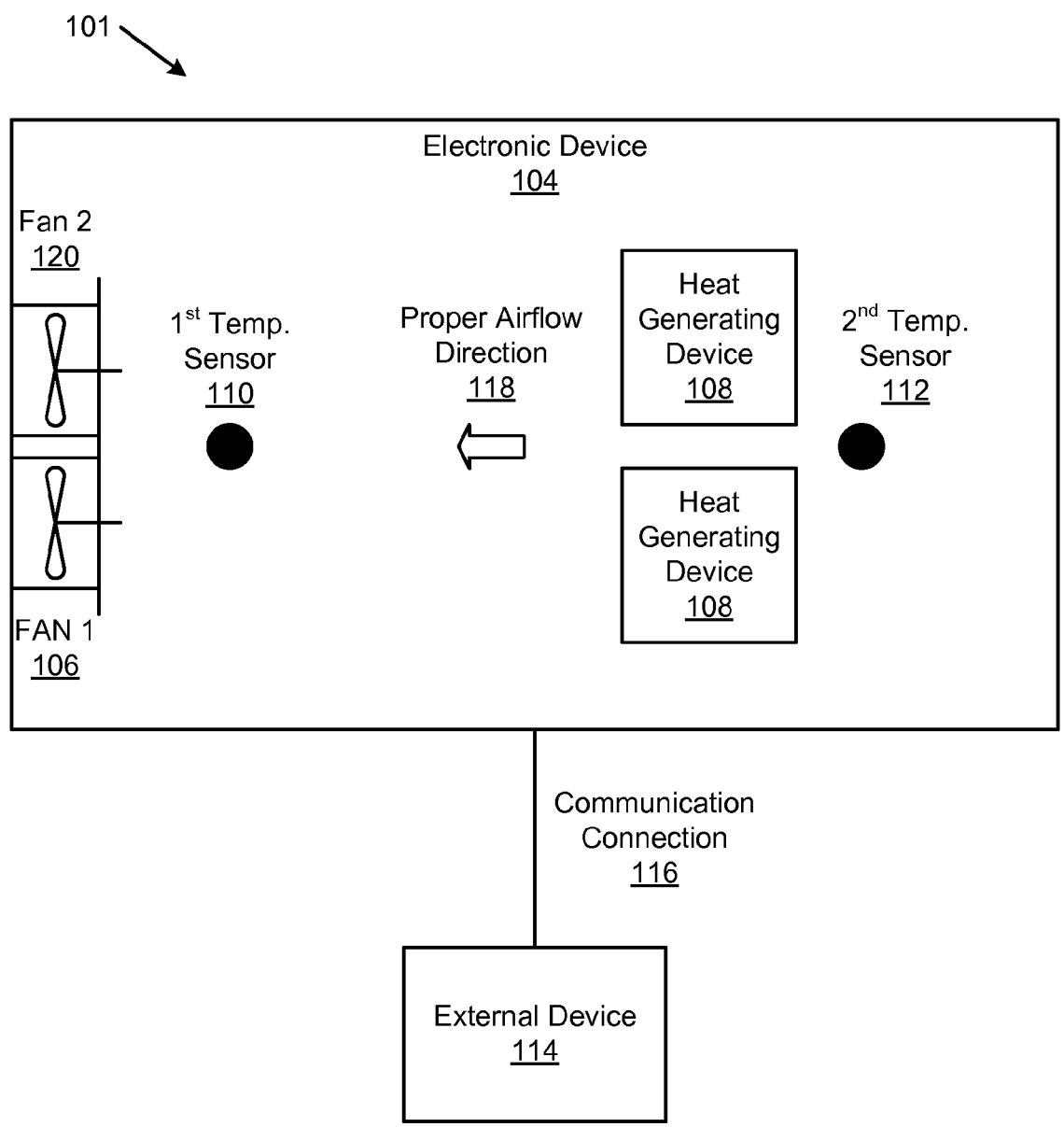
FIG. 1B is a schematic block diagram illustrating an alternate embodiment of a system for detecting fan rotation direction in an electronic device in accordance with the present invention.

FIG. 1B is a schematic block diagram illustrating an alternate embodiment of a system 101 for detecting fan rotation direction in an electronic device in accordance with the present invention. The system 101 is substantially similar to the system 100 described with respect to FIG. 1A and the components shown 104-116 also substantially similar. The fan 106 in the system 101 is a first fan 106 and the system 101 includes a second fan 120. With two fans 106, 120, there is a possibility for one or both of the fans 106, 120 to be incorrectly connected so that one or both of the fans 106, 120 rotate to direct air opposite of the proper airflow direction 118.

In a case where both fans 106, 120 are connected incorrectly, TS2 will be higher than TS1 and a fan rotation error signal will be generated. If one fan (e.g. fan 2 120) is connected incorrectly while the other fan (fan 1 106) is correctly connected, air flow will typically be significantly reduced through the electronic device 104. In this case, if the second temperature sensor 112 is close to one or more heat generating devices 108, TS2 will also be higher than TS1 and a fan rotation error signal will be generated.

Figure 1C:
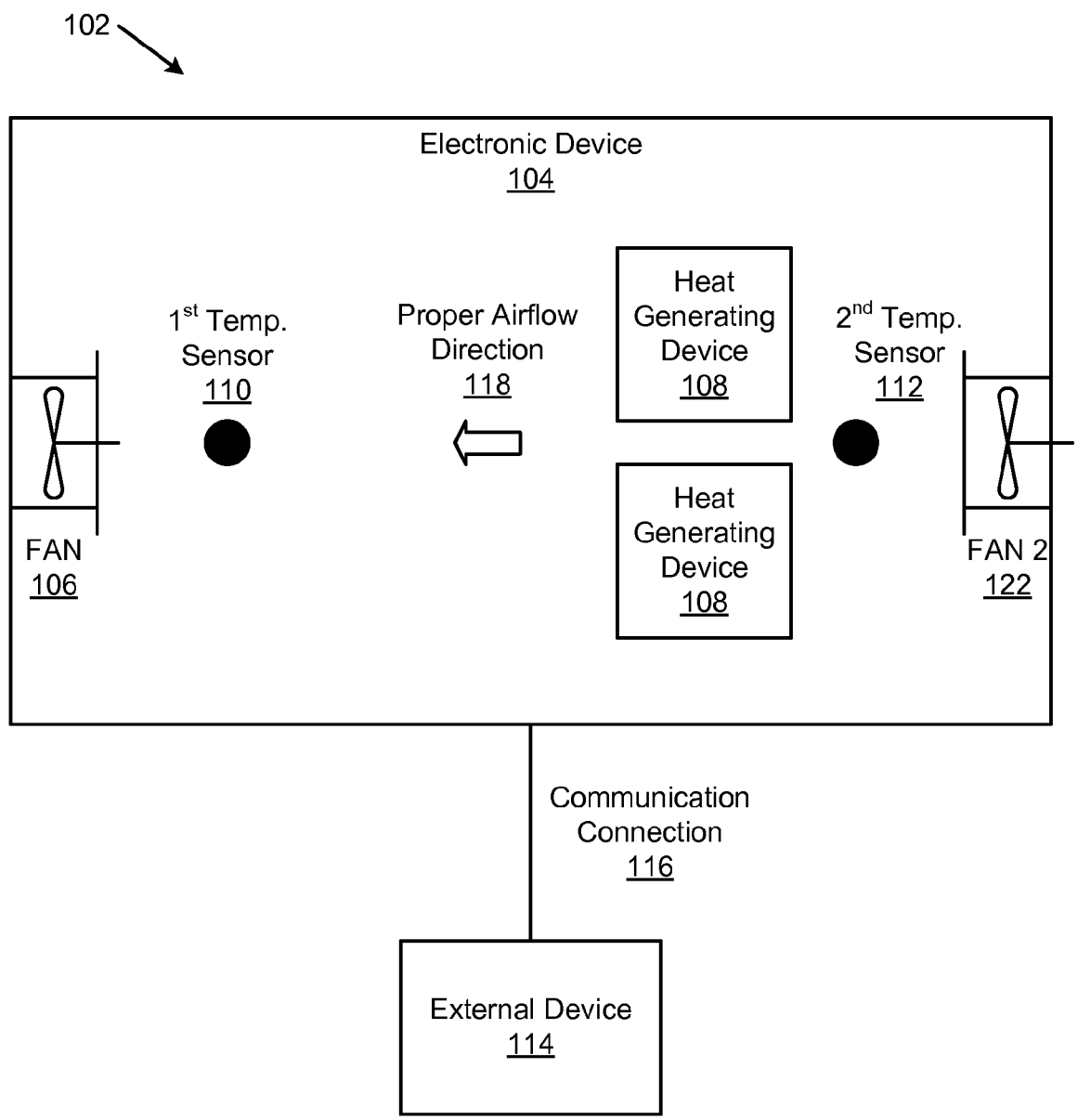
FIG. 1C is a schematic block diagram illustrating another alternate embodiment of a system for detecting fan rotation direction in an electronic device in accordance with the present invention.

FIG. 1C is a schematic block diagram illustrating another alternate embodiment of a system 102 for detecting fan rotation direction in an electronic device in accordance with the present invention. The system 102 is substantially similar to the system 100 described with respect to FIG. 1A and the components shown 104-116 also substantially similar. The fan 106 in the system 102 is a first fan 106 and the system 102 includes a second fan 122. Again, with two fans 106, 122, there is a possibility for one or both of the fans 106, 122 to be incorrectly connected so that one or both of the fans 106, 122 rotate to direct air opposite of the proper airflow direction 122.

Again, where both fans 106, 122 are connected incorrectly, TS2 will be higher than TS1 and a fan rotation error signal will be generated. Also, if one fan (e.g. fan 2 122) is connected incorrectly while the other fan (fan 1 106) is correctly connected, air flow will typically be significantly reduced through the electronic device 104. In this case, if the second temperature sensor 112 is close to one or more heat generating devices 108, TS2 will also be higher than TS1 and a fan rotation error signal will be generated.

Other fan combinations are also possible and the invention described herein may be used for any combination of sensors 110, 112 positioned to detect a fan rotation direction error. For example, an electronic device 104 may include separate compartments with fans, each fan location may have two or more fans, fans may be positioned at an air intake and air exhaust, fans may be remote with air ducted in, and the like. In one example, the invention detects incorrectly connected ductwork. In this example, a fan 106 is rotating correctly, but a duct from the fan 106 may be connected to an air intake instead of an air exhaust. In this situation TS2 will be higher than TS1 and a fan rotation error signal will be generated. One of skill in the art will recognize other configurations of fans 106, 120, 122 and configurations and quantities of temperature sensors 110, 112 to detect a direction of rotation of a fan 106, 120, 122.

Figure 2:
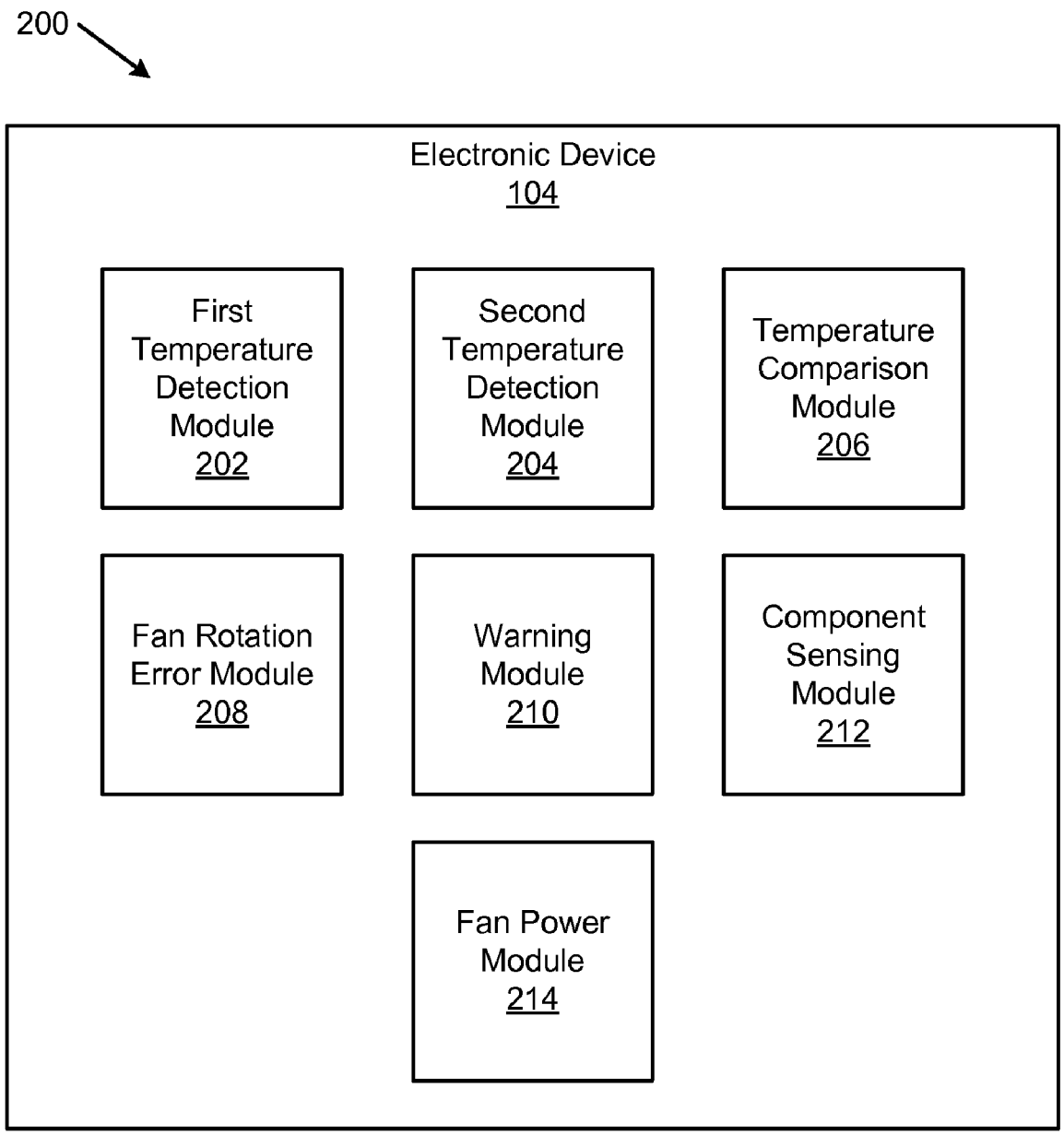
FIG. 2 is a schematic block diagram illustrating one embodiment of an apparatus for detecting fan rotation direction in an electronic device in accordance with the present invention.

FIG. 2 is a schematic block diagram illustrating one embodiment of an apparatus 200 for detecting fan rotation direction in an electronic device in accordance with the present invention. The apparatus 200 includes an electronic device 104 which is substantially similar to the electronic device 104 described above in relation to the systems 100, 101, 102 of FIGS. 1A, 1B, and 1C. The apparatus 200 includes a first temperature detection module 202, a second temperature detection module 204, a temperature comparison module 206, a fan rotation error module 208, a warning module 210, a component sensing module 212, and a fan power module 214, which are described below.

The modules 202-214 of the apparatus 200, in one embodiment, are in the electronic device 104, but in other embodiments, a portion or all of modules 202-214 may be located in other locations. For example, if the electronic device 104 is within a computer or other device, the all or a portion of the modules 202-214 may be in the computer or other device.

The apparatus 200 includes a first temperature detection module 202 that detects a first temperature at a first location. As described above, the first location is a location between at least one fan 106 and at least one heat generating device 108. The fan 106 provides cooling for the heat generating device(s) 108 by drawing air from the heat generating device(s) 108 across the first location to the fan 106 when the fan 106 is rotating in a first direction. The apparatus 200 includes a second temperature detection module 204 that detects a second temperature at a second location. The second location is a location where the heat generating device(s) 108 are between the second location and the fan 106 such that heat from the generating device(s) 108 is drawn away from the second location when the fan 106 is rotating in the first direction.

The first temperature detection module 202 and the second temperature detection module 204, in one embodiment, include one or more temperature sensors 110, 112. Where the first and/or second temperature detection modules 202, 204 include more than one temperature sensor 110, 112, the temperatures may be combined in some way to provide a first temperature and a second temperature. The temperature sensors 110, 112 may be thermistors, thermocouples, or any other sensor capable of detecting temperature in an electronic device 104 where the detected temperatures can be compared. The first and second temperature detection modules 202, 204, may include components in addition to the sensors 110, 112, such as resistors, capacitors, integrated circuits, micro code, and the like. One of skill in the art will recognize other ways to implement a first and a second temperature detection module 202, 204 to generate temperatures to be compared.

The apparatus 200 includes a temperature comparison module 206 that determines if the second temperature is above the first temperature. In one embodiment, the temperature comparison module 206 includes a comparator. In another embodiment, the first and second temperatures are compared digitally by the temperature comparison module 206. One of skill in the art will recognize other ways to implement a temperature comparison module 206 to compare the first and second temperatures.

The apparatus 200 includes a fan rotation error module 208 that generates a fan rotation error signal in response to the temperature comparison module 206 determining that the second temperature is above the first temperature. Where the temperature comparison module 206 is a comparator, the fan rotation error signal may be the output signal of the comparator. The fan rotation error module 208 may generate a digital message, a signal on an analog line, an interrupt signal, or the like.

In one embodiment, the apparatus 200 includes a warning module 210 that generates a warning in response to the fan rotation error signal. The warning may take any form convenient to communicate that the fan 106 is rotating incorrectly. In one embodiment, the warning is in the form of generating a visible indicator of fan rotation error. For example, the warning may be lighting a light-emitting diode ("LED"), producing a message or symbol on a display, or any other visible signal that can be seen by a user. In another embodiment, the warning may include transmitting a warning message to a system. The external device 114 may be the system and the warning signal may be sent over the communication connection 116, as described above in relation to the systems 100, 101, 102 of FIGS. 1A, 1B, and 1C.

In another embodiment, the warning may take the form of an interrupt. In yet another embodiment, the warning may be stored as a warning message in a storage device for later retrieval. The warning module 210 may generate one or more of the above mentioned warnings. In one embodiment, the warning module 210 is part of the fan rotation error module 208 and the warning may include the fan rotation error signal. One of skill in the art will recognize other ways to generate a warning from the fan rotation error signal.

In another embodiment, the second location is near at least one heat generating device 108 and the apparatus 200 includes a component sensing module 212. The second temperature detection module 204 transmits the second temperature to the component sensing module 212 for determining a temperature of the heat generating device 108 positioned near the second location. Often, electronic devices 104 include temperature sensors 110, 112 for determining a temperature of a heat generating device 108 or other purpose. One advantage of the present invention is that a temperature sensor 110, 112 included in a design of an electronic device 104 may also be used to determine fan rotation direction. In another embodiment, a sensor 110, 112 used to measure ambient air temperature, case temperature, heat sink temperature, etc. may be used to determine fan rotation direction.

In one embodiment, the apparatus includes a fan power module 214 that determines if the fan 106 is commanded in an on state. The fan rotation error module 208 generates a fan rotation error signal in response to both the temperature comparison module 206 determining that the second temperature is above the first temperature and the fan power module 214 determining that the fan is commanded in an on state. In this embodiment, a fan rotation error signal is generated only when the fan is commanded on. This may prevent false fan rotation error signals when a fan is not yet commanded on.

Figure 3:
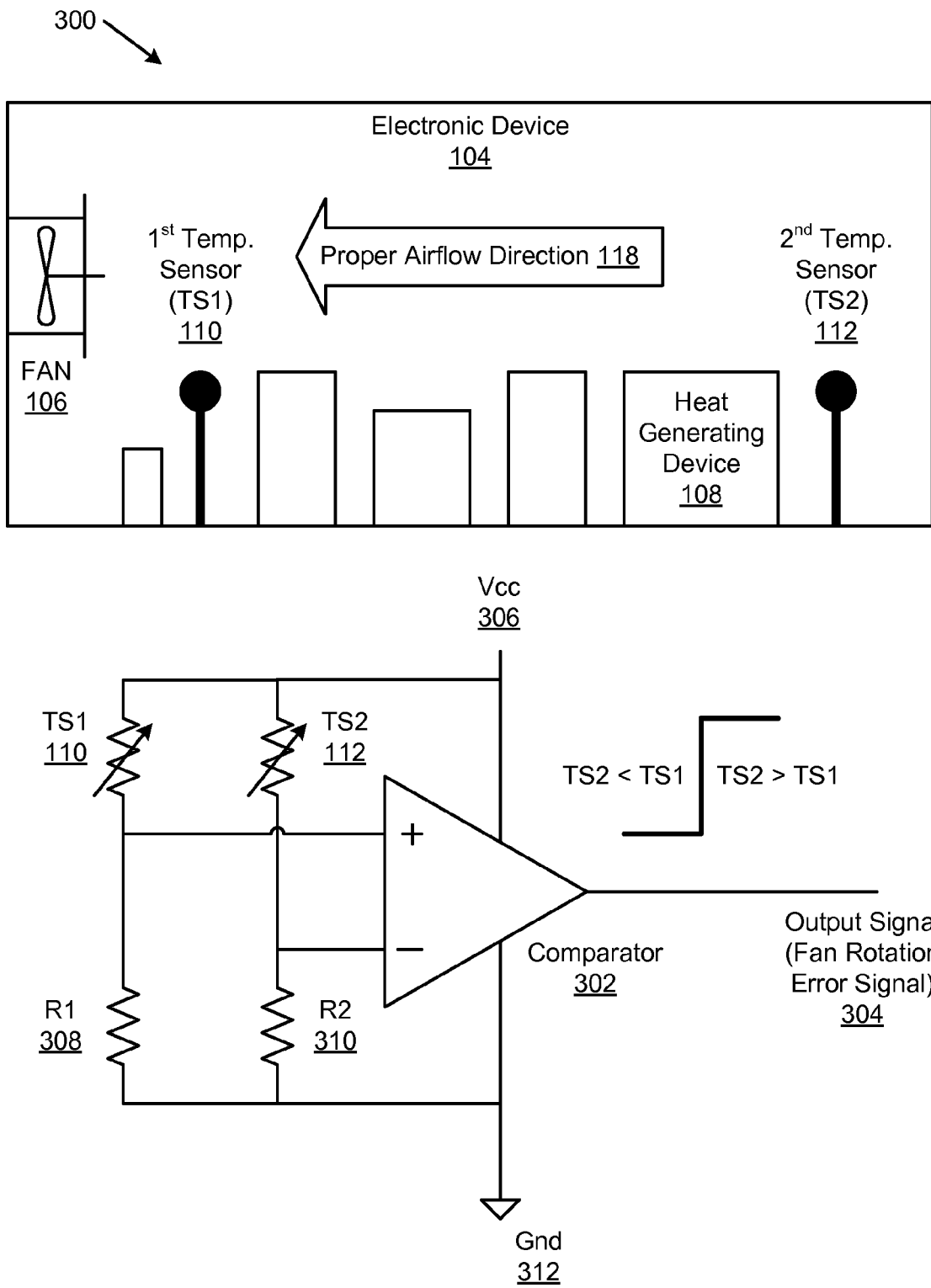
FIG. 3 is a schematic block diagram illustrating a specific embodiment of an apparatus for detecting fan rotation direction in an electronic device in accordance with the present invention.

FIG. 3 is a schematic block diagram illustrating a specific embodiment of an apparatus 300 for detecting fan rotation direction in an electronic device in accordance with the present invention. The apparatus 300 includes an electronic device 104 with a fan 106, a heat generating device 108, a first temperature sensor 110, a second temperature sensor 112, and a proper air flow direction 118, which are substantially similar to those in the systems 100, 101, 102 and in the apparatus 200 described above in relation to FIGS. 1A, 1B, 1C, and 2. The apparatus 300 includes a comparator 302 with an output signal 304 (fan rotation error signal) a supply voltage ("Vcc") 306, a first resistor ("R1") 308 and a second resistor ("R2") 310, and Ground ("Gnd") 312, which are described below.

The apparatus 300 includes a first temperature sensor 110 connected in a resistive divider with resistor R1 308 and connected between Vcc 306 and ground 312. The center of the resistive divider is connected to the comparator 302. Likewise the second temperature sensor 112 is connected in a resistive divider with resistor R2 310 and connected between Vcc 306 and ground 312. The center node of the second resistive divider is also connected to the comparator 302 as shown. As the temperatures change at the sensors TS1 110 and TS2 112, the resistance of the sensors 110, 112 changes.

When the temperature of TS2 110 is less than the temperature of TS1 112, the output signal 304 is low indicating that the fan 106 is rotating such that air is directed in the proper airflow direction 118. When the temperature of TS2 110 is greater than the temperature of TS1 112, the output signal 304 is high indicating that the fan 106 is rotating backwards such that air is directed opposite the proper airflow direction 118. This high output signal 304 is the fan rotation error signal and can then be used to generate a warning by the warning module 210.

The apparatus 300 is beneficial for determining fan rotation direction with minimal circuitry and cost, especially where the first and second temperature sensors 110, 112 are included in an electronic device 104 for other purposes. In this case, the direction of rotation of the fan 106 can be detected with the addition of inexpensive components, such as a comparator 302 and two resistors R1 308 and R2 310. The apparatus 300 is merely one embodiment, of the invention disclosed herein. Other circuits and instructions may be used to implement the present invention. One of skill in the art will recognize other ways to use two or more temperature sensors 110, 112 to determine fan rotation direction.

Figure 4:
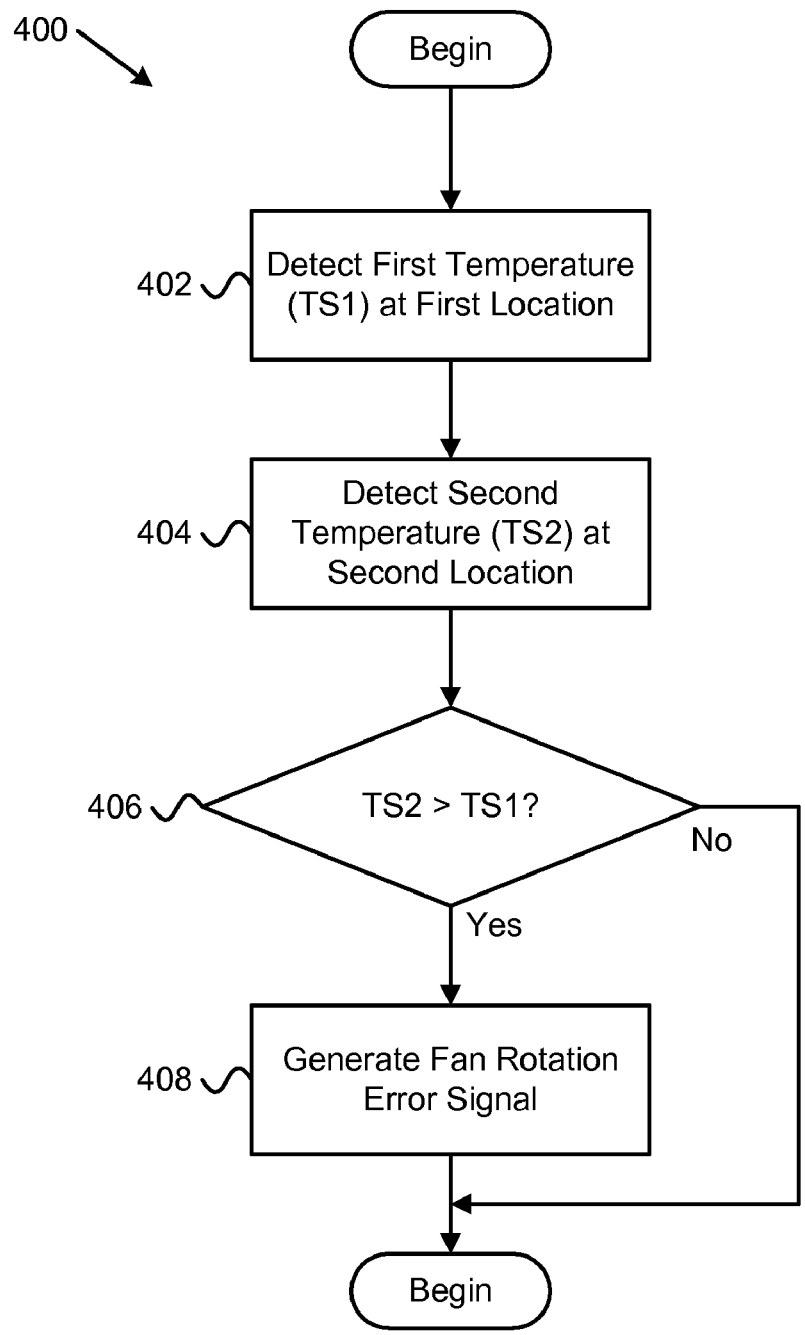
FIG. 4 is a schematic flow chart diagram illustrating one embodiment of a method for detecting fan rotation direction in an electronic device in accordance with the present invention.

FIG. 4 is a schematic flow chart diagram illustrating one embodiment of a method 400 for detecting fan rotation direction in an electronic device in accordance with the present invention. The method 400 begins and the first temperature detection module 202 detects 402 a first temperature (TS1) at a first location. The first location is between a fan 106 and one or more heat generating components 108. The second temperature detection module 204 detects 404 a second temperature (TS2) at a second location. The second location is such that the heat generating devices 108 are between the second location and the fan 106.

The temperature comparison module 206 compares the first and the second temperatures and determines 406 if the second temperature is above the first temperature. If the temperature comparison module 206 determines 406 that the second temperature is above the first temperature, the fan rotation error module 208 generates 408 a fan rotation error signal and the method 400 ends. If the temperature comparison module 206 determines 406 that the second temperature is not above the first temperature, the fan rotation error module 208 does not generate a fan rotation error signal and the method 400 ends. Typically, the temperature sensors 110, 112 continually detect temperature so the method 400 repeats throughout operation of the electronic device 104. Of course, in other embodiments the temperature comparison module 206 may cease operation at some point in time to increase efficiency.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to detect fan rotation direction, the apparatus comprising:
   a first temperature detection module that detects a first temperature at a first location, the first location comprising a location between at least one fan and at least one heat generating device, wherein the at least one fan provides cooling for the at least one heat generating device by drawing air from the at least one heat generating device across the first location to the fan when the at least one fan is rotating in a first direction such that the first location is downstream from the heat generating device when the at least one fan is rotating in a first direction;
   a second temperature detection module that detects a second temperature at a second location, the second location comprising a location wherein the at least one heat generating device is between the second location and the at least one fan such that heat from the at least one heat generating device is drawn away from the second location when the at least one fan is rotating in the first direction such that the second location is upstream from the heat generating device when the at least one fan is rotating in a first direction;
   a temperature comparison module that determines if the second temperature is above the first temperature; and
   a fan rotation error module that generates a fan rotation error signal in response to the temperature comparison module determining that the second temperature is above the first temperature.

2. The apparatus of claim 1, further comprising a warning module that generates a warning in response to the fan rotation error signal, the warning comprising one or more of generating a visible indicator of fan rotation error, transmitting a warning message to system in communication with the fan rotation error module, sending an interrupt, and storing a warning message.

3. The apparatus of claim 1, wherein the first temperature detection module and the second temperature detection module each comprise a temperature sensor.

4. The apparatus of claim 3, wherein each temperature sensor comprises one of a thermistor, a thermocouple, a resistance thermometer, and a silicon bandgap temperature sensor.

5. The apparatus of claim 1, further comprising at least one fan positioned to cool the at least one heat generating device by directing air across second location toward the at least one heat generating device.

6. The apparatus of claim 1, wherein the second location is near the at least one heat generating device such that the temperature comparison module determines that the second temperature is above the first temperature when insufficient air is drawn across the at least one heat generating device.

7. The apparatus of claim 6, wherein insufficient air is drawn across the at least one heat generating device due to one of:
   none of fans are rotating; and
   the at least one fan comprises two or more fans and at least one fan rotates in second direction, the second direction being opposite of the first direction.

8. The apparatus of claim 1, further comprising a component sensor module wherein the second location is near the at least one heat generating device and the second temperature detection module transmits the second temperature to the component sensor module for determining a temperature of the at least one heat generating device near the second location.

9. The apparatus of claim 1, wherein the temperature comparison module further comprises a comparator.

10. The apparatus of claim 1, wherein the first temperature detection module comprises two or more temperature sensors and the first temperature detection module combines temperature sensor readings of the two or more temperature sensors to detect the first temperature.

11. The apparatus of claim 1, wherein the second temperature detection module comprises two or more temperature sensors and the second temperature detection module combines temperature sensor readings of the two or more temperature sensors to detect the second temperature.

12. The apparatus of claim 1, further comprising a fan power module that determines if the fan is commanded in an on state, wherein the fan rotation error module generates a fan rotation error signal in response to the temperature comparison module determining that the second temperature is above the first temperature and the fan power module determining that the fan is commanded in an on state.

13. An apparatus to detect fan rotation direction, the apparatus comprising:

a first temperature sensor that detects a first temperature at a first location, the first location comprising a location between a fan and at least one heat generating device, wherein the fan provides cooling for the at least one heat generating device by drawing air from the at least one heat generating device across the first location to the fan when the fan is rotating in a first direction such that the first location is downstream from the heat generating device when the at least one fan is rotating in a first direction;

a second temperature sensor that detects a second temperature at a second location, the second location comprising a location wherein the at least one heat generating device is between the second location and the fan such that heat from the at least one heat generating device is drawn away from the second location when the fan is rotating in the first direction such that the second location is upstream from the heat generating device when the at least one fan is rotating in a first direction; and a temperature comparator connected to the first temperature sensor and to the second temperature sensor, wherein the temperature comparator compares a first temperature detected by the first temperature sensor with a second temperature detected by the second temperature sensor; wherein the temperature comparator generates and output signal when the second temperature is greater than the first temperature.

14. A system to detect fan rotation detection, the system comprising:

an electronic device comprising at least one heat generating component;

at least one fan positioned to provide cooling for the at least one heat generating component;

a first temperature detection module that detects a first temperature at a first location in the electronic device, the first location comprising a location between the at least one fan and the at least one heat generating device, wherein the at least one fan provides cooling for the at least one heat generating device by drawing air from the at least one heat generating device across the first location to the fan when the at least one fan is rotating in a first direction such that the first location is downstream from the heat generating device when the at least one fan is rotating in a first direction;

a second temperature detection module that detects a second temperature at a second location in the electronic device, the second location comprising a location wherein the at least one heat generating device is between the second location and the at least one fan such that heat from the at least one heat generating device is drawn away from the second location when the at least one fan is rotating in the first direction such that the second location is upstream from the heat generating device when the at least one fan is rotating in a first direction;

a temperature comparison module that determines if the second temperature is above the first temperature; and a fan rotation error module that generates a fan rotation error signal in response to the temperature comparison module determining that the second temperature is above the first temperature.

15. The system of claim 14, wherein the electronic component comprises one of a power supply, a computer, a central processing unit ("CPU") apparatus, a switch, a router, a blade, and an appliance.

16. The system of claim 14, further comprising a communication connection, wherein the fan rotation error module transmits the fan rotation error signal to an external device via the communication connection.

17. A computer program product comprising a computer readable medium having computer usable program code executable to perform operations for detecting fan rotation direction, the operations of the computer program product comprising:

detecting a first temperature at a first location, the first location comprising a location between at least one fan and at least one heat generating device, wherein the at least one fan provides cooling for the at least one heat generating device by drawing air from the at least one heat generating device across the first location to the fan when the at least one fan is rotating in a first direction such that the first location is downstream from the heat generating device when the at least one fan is rotating in a first direction;

detecting a second temperature at a second location, the second location comprising a location wherein the at least one heat generating device is between the second location and the at least one fan such that heat from the at least one heat generating device is drawn away from the second location when the at least one fan is rotating in the first direction such that the second location is upstream from the heat generating device when the at least one fan is rotating in a first direction;

determining if the second temperature is above the first temperature; and generating a fan rotation error signal in response to determining that the second temperature is above the first temperature.

18. The computer program product of claim 17, further comprising generating a warning in response to the fan rotation error signal, the warning comprising one or more of generating a visible indicator, transmitting a warning message to an external system, sending an interrupt, and storing a warning message.

19. The computer program product of claim 17, wherein the fan rotation error signal is generated in response to determining that the second temperature is above the first temperature and determining that the fan is commanded in an on state.

20. The computer program product of claim 17, further comprising one or more of combining temperature sensor readings of two or more sensors to determine the first temperature and combining temperature sensor readings of two or more sensors to determine the second temperature.

* * * * *